(12) United States Patent
Kaneko et al.

(10) Patent No.: US 10,060,466 B2
(45) Date of Patent: Aug. 28, 2018

(54) FASTENING DEVICE AND HOOK PART

(71) Applicant: YKK Corporation, Tokyo (JP)

(72) Inventors: Hitoshi Kaneko, Toyama (JP); Yu Hashimoto, Tokyo (JP)

(73) Assignee: YKK Corporation (JP)

( * ) Notice: Subject to any disclaimer, the term of this patent is extended or adjusted under 35 U.S.C. 154(b) by 275 days.

(21) Appl. No.: 14/888,726

(22) PCT Filed: May 8, 2013

(86) PCT No.: PCT/JP2013/062956
§ 371 (c)(1),
(2) Date: Nov. 3, 2015

(87) PCT Pub. No.: WO2014/181405
PCT Pub. Date: Nov. 13, 2014

(65) Prior Publication Data
US 2016/0084292 A1   Mar. 24, 2016

(51) Int. Cl.
*A44B 13/02* (2006.01)
*F16B 45/02* (2006.01)
(Continued)

(52) U.S. Cl.
CPC .............. *F16B 45/02* (2013.01); *A45C 13/30* (2013.01); *A45F 2003/001* (2013.01)

(58) Field of Classification Search
CPC .... F16B 45/02; A45C 13/30; Y10T 24/45419; Y10T 24/45408
See application file for complete search history.

(56) References Cited

U.S. PATENT DOCUMENTS 3,748,703 A * 7/1973 Maillocheau ........... F16B 45/00
24/265 H
4,464,813 A * 8/1984 Bakker .................. A44B 11/28
24/601.1
(Continued)

FOREIGN PATENT DOCUMENTS

DE   1730871 U   9/1956
JP   018561/1979   2/1979
(Continued)

OTHER PUBLICATIONS

International Preliminary Report on Patentability, PCT Application No. PCT/JP2013/062956, dated Nov. 19, 2015.
(Continued)

*Primary Examiner* — Victor D Batson
*Assistant Examiner* — Matthew J Sullivan
(74) *Attorney, Agent, or Firm* — Kilpatrick Townsend & Stockton LLP

(57) ABSTRACT

A hook part includes a hook main body; a latch for closing the hook main body; and a shaft to which the base end of the latch is integrally coupled, the shaft extending away from the hook main body along the rotational axis such that coupling between the attachment part and the hook part is ensured. A latch includes a spring portion provided closer to the base end of the latch; and a latch main body coupled with the coupled portion via the spring portion. The spring portion is elastically configured to enable urging of the latch away from the hook main body. The connection point of the latch and the shaft is farther from the hook main body along the rotational axis than the connection point of the hook main body and the coupled portion.

13 Claims, 15 Drawing Sheets

(51) Int. Cl.
*A45C 13/30* (2006.01)
*A45F 3/00* (2006.01)

(56) References Cited

U.S. PATENT DOCUMENTS

| | | | | |
|---|---|---|---|---|
| 4,617,704 A * | 10/1986 | Kasai | ............... | A45C 13/30 24/600.9 |
| 4,665,592 A * | 5/1987 | Kasai | ............... | B29C 45/26 24/600.9 |
| 4,908,913 A * | 3/1990 | Mori | ............... | F16B 45/02 24/599.4 |
| 5,027,477 A * | 7/1991 | Seron | ............... | A44B 11/2584 119/865 |
| 5,092,018 A * | 3/1992 | Seron | ............... | A44B 11/2584 119/858 |
| 5,161,287 A * | 11/1992 | Picollet | ............... | B29C 45/0055 24/599.9 |
| 5,624,094 A * | 4/1997 | Protz, Jr. | ............... | F16B 45/02 24/375 |
| 5,671,514 A * | 9/1997 | Matoba | ............... | F16B 45/02 24/600.9 |
| 5,761,776 A * | 6/1998 | Vollebregt | ............... | F16B 45/02 24/706.1 |
| 6,000,108 A * | 12/1999 | Roan | ............... | B66C 1/36 24/265 H |
| 6,317,940 B1 * | 11/2001 | Matoba | ............... | F16B 45/02 24/600.9 |
| 6,574,839 B2 * | 6/2003 | Matoba | ............... | F16B 45/02 24/600.9 |
| D500,244 S * | 12/2004 | Yoshiguchi | ............... | D8/367 |
| 6,874,210 B1 * | 4/2005 | Whitby | ............... | A47G 25/32 223/91 |
| 6,925,690 B2 * | 8/2005 | Sievers | ............... | F16B 45/02 24/598.4 |
| D649,024 S * | 11/2011 | Takazakura | ............... | D8/367 |
| 8,448,307 B2 * | 5/2013 | Mitchell | ............... | F16B 45/02 24/265 H |
| 9,121,437 B1 * | 9/2015 | Carnicle | ............... | F16B 45/02 |
| D740,645 S * | 10/2015 | Koreishi | ............... | D8/367 |
| 9,500,438 B2 * | 11/2016 | Mayberry | ............... | F41C 23/02 |
| 2008/0040900 A1 | 2/2008 | Uehara | | |
| 2015/0231815 A1 * | 8/2015 | Shoham | ............... | B29C 49/482 428/36.4 |
| 2015/0322996 A1 * | 11/2015 | Mitchell | ............... | F16B 45/04 24/303 |
| 2016/0341239 A1 * | 11/2016 | Inkavesvaanit | ............... | F16B 45/02 |

FOREIGN PATENT DOCUMENTS

| | | |
|---|---|---|
| JP | 5-83435 | 11/1993 |
| JP | 7-23413 | 5/1995 |
| JP | 10-030628 A | 2/1998 |
| JP | 2008-045683 | 2/2008 |

OTHER PUBLICATIONS

International Search Report, PCT Application No. PCT/JP2013/062956, dated Jul. 16, 2013.

Office Action, German Patent Application No. 112013007042.1, dated Nov. 17, 2017.

* cited by examiner

FASTENING DEVICE AND HOOK PART

This application is a national stage application of PCT/JP2013/062956, which is incorporated herein by reference.

TECHNICAL FIELD

The present invention relates to a fastening device and a hook part.

BACKGROUND ART

From past, various fastening devices have been developed. Patent Literature 1 discloses, in its abstract, that a hook part (23) is simply and firmly connected to a connection body (11) attached to a belt. Additionally seeing FIGS. 2 and 3 of the same document, an inside (16) of the connection body (11) is shaped to be a semispherical cavity and a coupling recess (15) having an insertion hole (19) is provided in a base portion (18) thereof. A hook part (12) is provided with a spherical coupling portion (21), a hook part (23) having a locking portion (22) at a distal end extending from the coupling portion (21) and an auxiliary latch (24) parallel to the hook part (23). As shown in FIG. 2, when the hook part (23) of the hook part (12) is inserted into the coupling recess (15) of the connection body (11), the coupling portion (21) of the hook part (12) engages with a semispherical cavity (16) of the connection body (11) and rotatably couples therewith.

Patent Literature 2 discloses, in its FIGS. 1 and 2, a structure in which a guide piece (13), a locking piece (14) with a lug (16) and a bridge (15) are provided in a coupling portion (10) of a loop clutch body (2) used for coupling with a support body (1). The document describes that this structure allows the loop clutch to be assembled to the support body (1) by simple manipulation and can reduce backlash and keep smooth rotation.

CITATION LIST

Patent Literature

Patent Literature 1: Japanese Utility Model Laid-Open No. 7-23413
Patent Literature 2: Japanese Utility Model Laid-Open No. 5-83435

SUMMARY OF INVENTION

Technical Problem

A resin part integral with a hook part may be used as a latch of the hook part, reducing the number of parts, facilitating easier assembling and reducing the product cost compared to a case where a separate metal part is used for the latch. However, when the resin part integral with the hook part is used for the latch, there may be a concern that "latching strength" may be seemingly weaker compared to a case where the metal piece is used.

In light of the aforementioned illustrative non-limiting concerns, the present inventor has newly found the significance of the structure suitable to improve the appearance of the hook part or to allow functional additions.

Solution to Problem

A fastening device (10) according to an aspect of the present invention may be a fastening device in which an attachment part (100) and a hook part (200) are rotatably coupled around a rotational axis,
the hook part (200) comprising:
a hook main body (210);
a latch (230) for closing the hook main body (210); and
a coupled portion (270) to which the base end of the latch (230) is integrally coupled, the coupled portion (270) extending away from the hook main body (210) along the rotational axis such that coupling between the attachment part (100) and the hook part (200) is ensured, wherein
the latch (230) may comprise:
a spring portion (240) provided closer to the base end of the latch (230), the spring portion (240) being elastically configured to enable urging of the latch (230) away from the hook main body (210); and
a latch main body (250) coupled with the coupled portion (270) via the spring portion (240), and wherein
the connection point of the latch (230) and the coupled portion (270) may be farther from the hook main body (210) along the rotational axis than the connection point of the hook main body (210) and the coupled portion (270).

This configuration may facilitate improvement of an appearance of the hook part or easier functional additions. It should be noted that the extent of the distance referred by "farther" may possibly be insignificant.

In a case where a left-right direction is defined as a direction orthogonal to a plane in which the latch (230) pivotally moves around the spring portion (240) to open/close the hook main body (210), one of the hook main body (210) and the latch (230) may comprise at least one restricting portion (260, 267) to restrict displacement in the left-right direction of the other of the hook main body (210) and the latch (230). This may prevent the disengagement of the latch from the hook main body.

The restricting portion (260, 267) may preferably be configured to sandwich the hook main body (210) or the latch (230) in the left-right direction. This may more sufficiently prevent the disengagement of the latch from the hook main body.

The restricting portion (260) may preferably be engageable with the hook main body (210) or the latch (230) so as to restrict displacement of the latch (230) in a direction away from the hook main body (210). This may more sufficiently prevent the disengagement of the latch from the hook main body.

The restricting portion (260) provided on the hook main body (210) may comprise at least one first lug (263, 264), the latch (230) may comprise at least one second lug (253, 254), the second lug (253, 254) may be shaped to protrude in the left-right direction, and the first lug (263, 264) may extend in a direction other than the left-right direction so as to be engageable with the second lug.

The restricting portion (260) provided on the latch (230) may comprise at least one first lug (263, 264), the hook main body (210) comprises at least one second lug (253, 254), and the first lug (263, 264) and the second lug (253, 254) to be interlocked one another are oppositely projected in the left-right direction.

In a case where the restricting portion (260) comprises a left restricting wall (261) and a right restricting wall (262) arranged in the left-right direction so as to sandwich the hook main body (210) or the latch (230), the fastening device (10) may further comprises: a first lug (263, 264) provided on at least one of the left restricting wall (261) and the right restricting wall (262); and a second lug (253, 254) engageable with the first lug (263, 264), wherein interlocking between first lug (263, 264) and the second lug (253, 254) restricts displacement of the latch (230) away from the hook main body (210). This may more sufficiently prevent the disengagement of the latch from the hook main body.

In a case where the restricting portion (260) comprises a left restricting wall (261) and a right restricting wall (262) arranged in the left-right direction so as to sandwich the hook main body (210) or the latch (230), the latch main body (250) comprises a latch distal end (231) that engages with the hook distal end (211) of the hook main body (210), and a thickness of the latch distal end (231) along the left-right direction is greater than a thickness along the left-right direction of a portion of the latch main body (250) sandwiched by the left restricting wall (261) and right restricting wall (262). This may contribute to more robust appearance of the hook part.

The coupled portion (270) may preferably be provided with a recess and a base end of the spring portion (240) may preferably be coupled with a surface of the recess.

A notch (R28) extending through at least the coupled portion (270) from the surface of the recess toward the hook main body (210) may preferably be provided, and the notch (R28) may be able to partially accommodate the latch (230). A pivotal movement of the latch (230) may preferably be secured.

The hook part (200) may further comprise a rest (280) between the coupled portion (270) and the hook main body (210), the attachment part (100) being able to sit on the rest (280), and wherein the connection point of the latch (230) and the coupled portion (270) may be farther from the hook main body (210) than the rest (280) along the rotational axis.

The hook part (200) may further comprise a rest (280) on which the attachment part (100) can sit, and the latch (230) may be shaped to provide a rest surface for the attachment part (100) together with the rest (280). The rotational move of the attachment part on the hook part may be much stabilized.

A hook part (200) according to another aspect of the present invention which is attachable to an attachment part (100) in a rotatable manner around a rotational axis, the hook part (200) may be comprising:

a hook main body (210);

a latch (230) for closing the hook main body (210); and a coupled portion (270) with which the base end of the latch (230) is integrally coupled, the coupled portion (270) extending away from the hook main body (210) along the rotational axis such that coupling between the attachment part (100) and the hook part (200) is ensured, wherein the latch (230) may be comprising:

a spring portion (240) provided closer to the base end of the latch (230), the spring portion (240) being elastically configured to enable urging of the latch (230) away from the hook main body (210); and a latch main body (250) coupled with the coupled portion (270) via the spring portion (240), and the connection point of the latch (230) and the coupled portion (270) is farther from the hook main body (210) along the rotational axis than the connection point of the hook main body (210) and the coupled portion (270).

Advantageous Effects of Invention

The present invention may provide a structure suitable to facilitate improvement of an appearance of the hook part or easier functional additions.

DESCRIPTION OF EMBODIMENTS

Hereinafter, embodiments of the present invention will be described with reference to the accompanying drawings. The respective embodiments are not independent of each other, may be appropriately combined by those skilled in the art without requiring excessive description and synergistic effects by such a combination may also be comprehensible. Duplicate description among the embodiments will be omitted in principle. Drawings to be referenced are principally intended to describe the present invention and are simplified as appropriate.

The following embodiments will be described with up-down, left-right and front-back directions shown in FIG. 1 as a reference. The up-down direction is a direction parallel to the rotational axis of an attachment part and a hook part. The front-back direction and left-right direction are directions orthogonal to the up-down direction, and orthogonal to each other. The left-right direction is a direction orthogonal to the plane in which the latch pivots to open/close the hook main body.

First Embodiment

Figure 4:
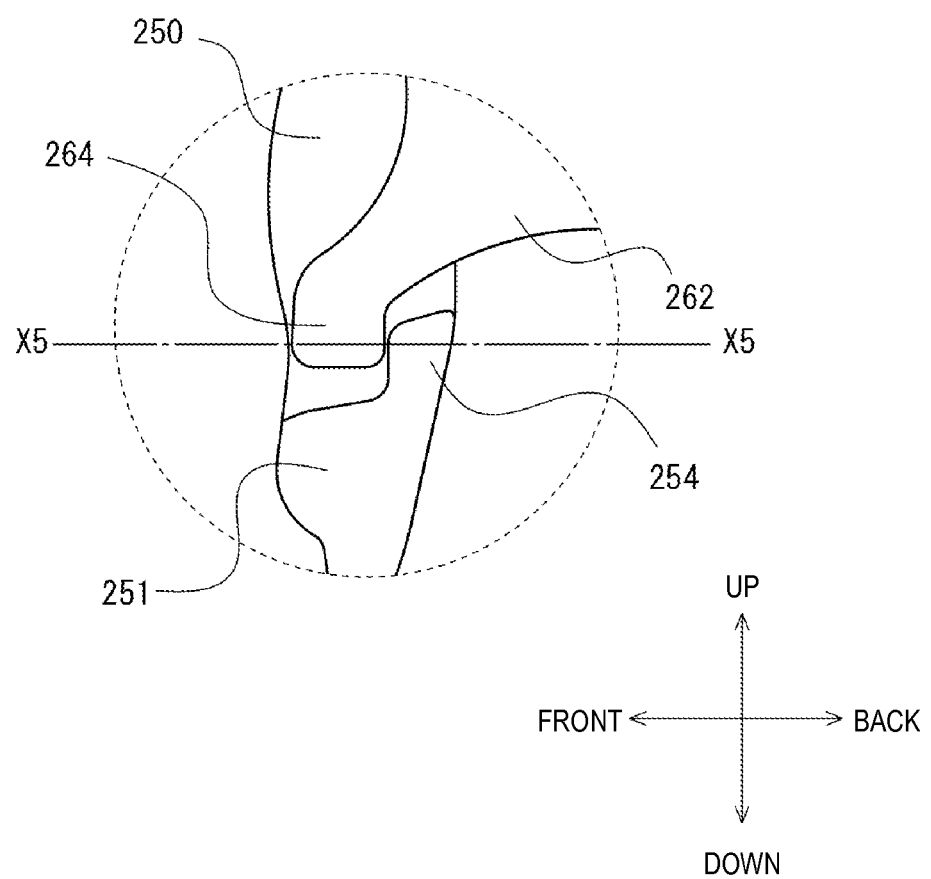
FIG. 4 is a partially enlarged side view of the fastening device according to the first embodiment of the present invention, which is a partially enlarged side view of a range corresponding to the broken line circle in FIG. 3 and illustrating the engagement of the lug of a restricting portion of the hook main body and the lug of the latch main body.
Figure 5:
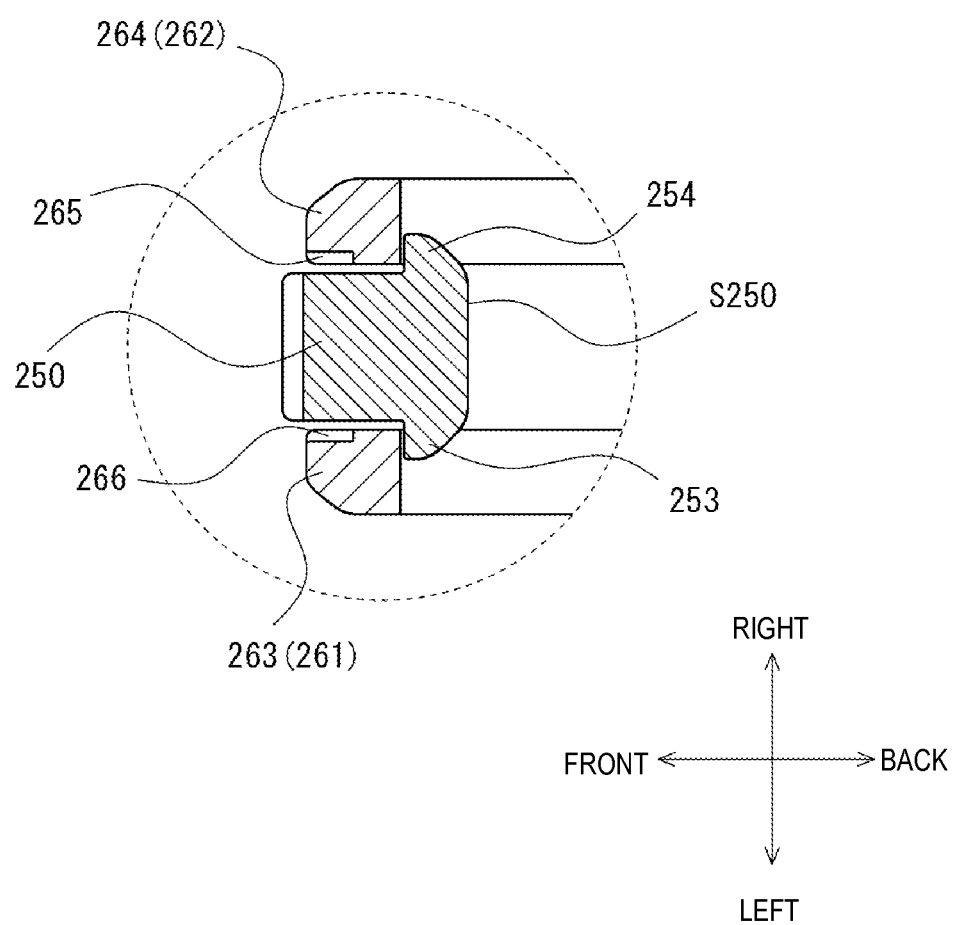
FIG. 5 is a partial horizontal cross-sectional view of the fastening device according to the first embodiment of the present invention, illustrating a horizontal cross section along a broken line X5-X5 of FIG. 4.
Figure 6:
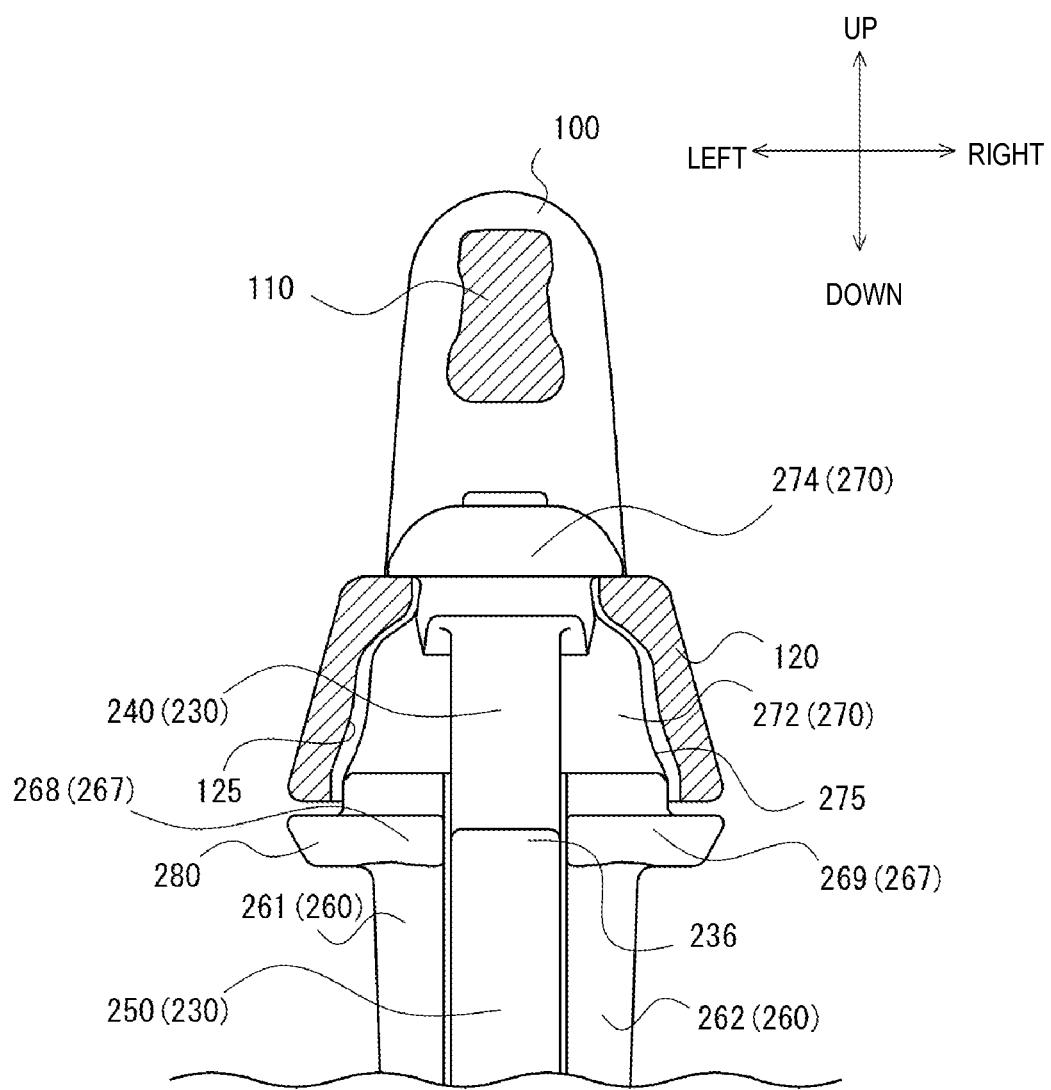
FIG. 6 is a partial vertical schematic diagram of the fastening device according to the first embodiment of the present invention, illustrating a cross section of the attachment part and a side view of the hook part.
Figure 7:
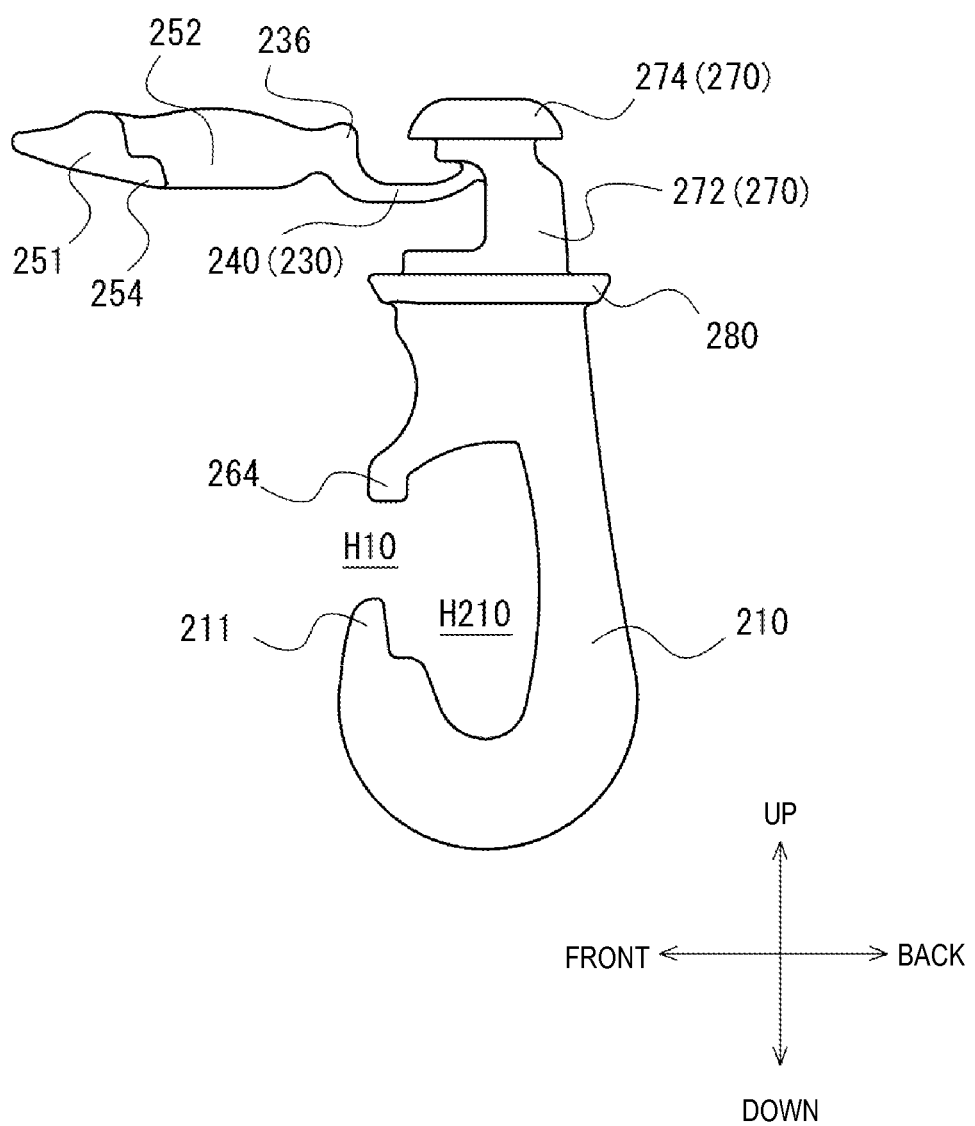
FIG. 7 is a side schematic diagram of the hook part of the fastening device according to the first embodiment of the present invention, illustrating a molded latch in an initial posture or initial position.
Figure 8:
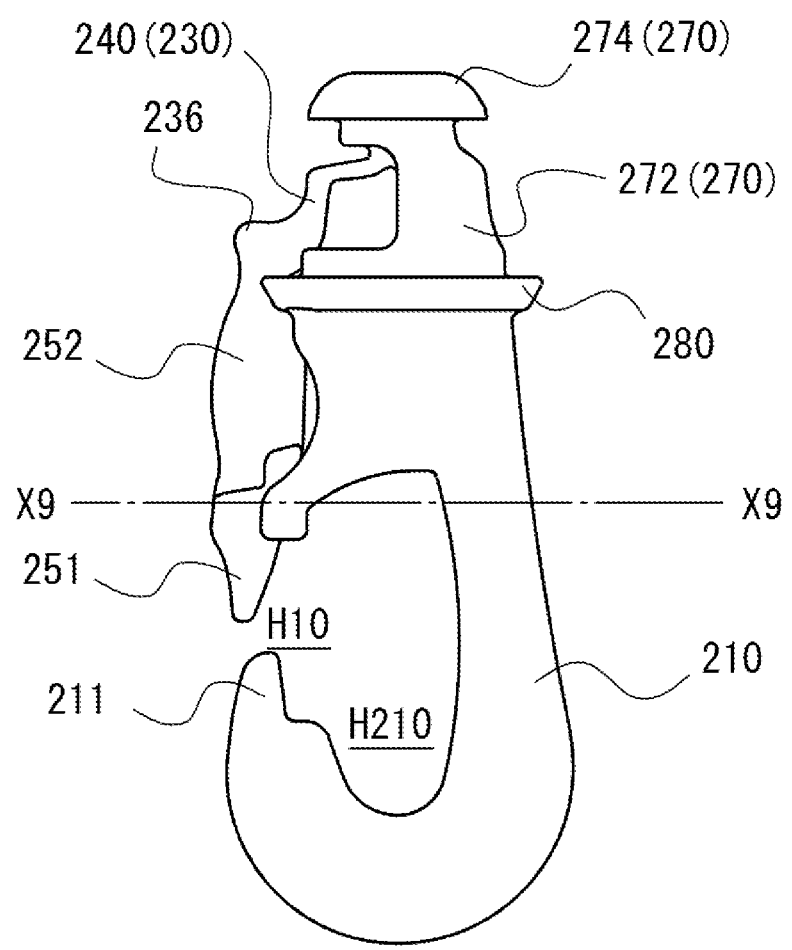
FIG. 8 is a side schematic diagram of the hook part of the fastening device according to the first embodiment of the present invention, illustrating a process in which the latch is pushed in between a left restricting wall and a right restricting wall provided in the hook main body.
Figure 9:
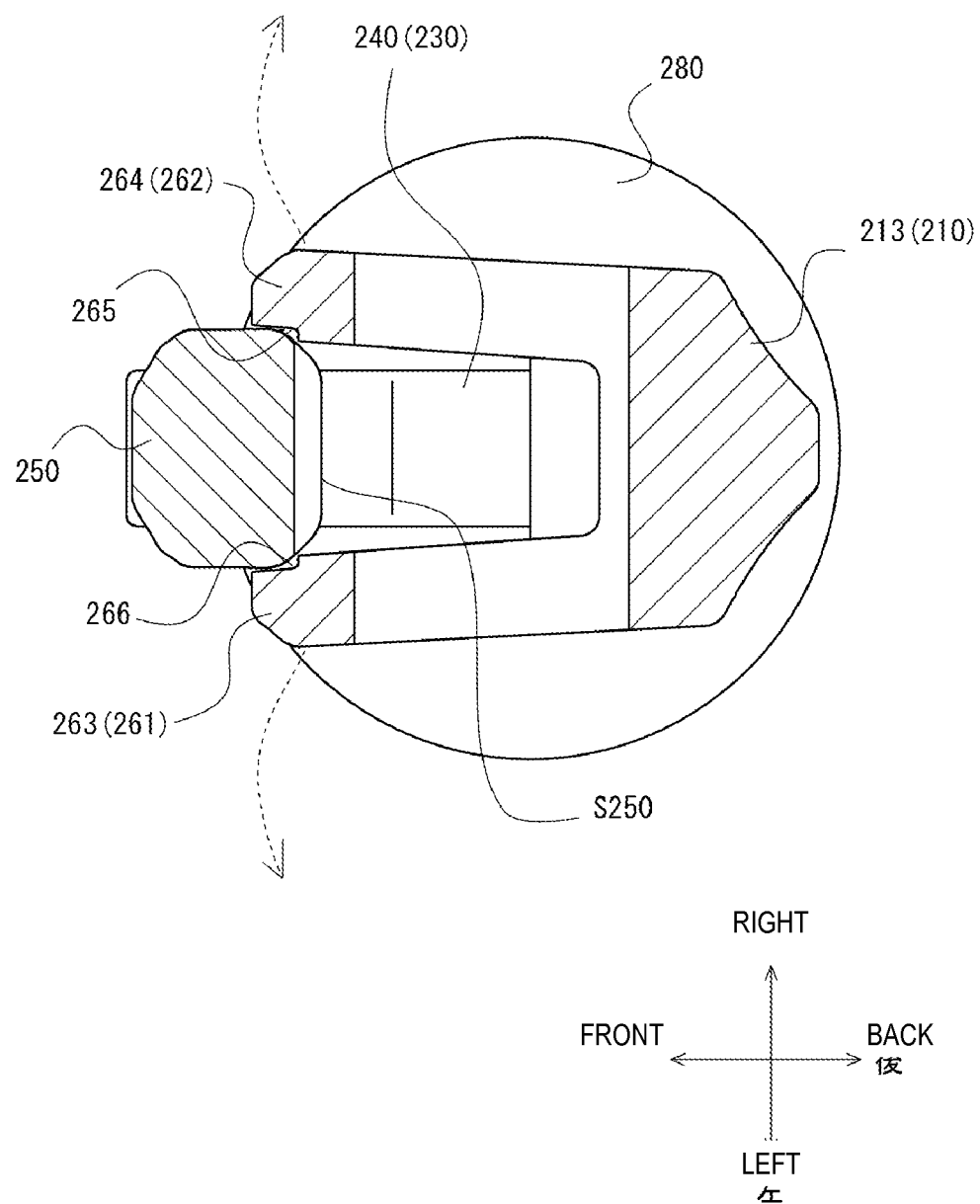
FIG. 9 is a partial horizontal cross-sectional view of the fastening device according to the first embodiment of the present invention, illustrating a horizontal cross section along a broken line X9-X9 of FIG. 8.

A first embodiment will be described with reference to FIGS. 1 to 9. FIG. 1 is a perspective view of a fastening device, illustrating an attachment part and a hook part before coupling. FIG. 2 is a perspective view of the fastening device, showing the attachment part and the hook part coupled together. FIG. 3 is a vertical cross section schematic diagram of the fastening device, showing a cross section schematic diagram on a plane orthogonal in the left-right direction. FIG. 4 is a partially enlarged side view of the fastening device, which is a partially enlarged side view of a range corresponding to the broken line circle of FIG. 3, illustrating the engagement between a lug of a restricting portion of the hook main body and a lug of the latch main body. FIG. 5 is a partial horizontal cross-sectional view of the fastening device, illustrating a horizontal cross section along a broken line X5-X5 of FIG. 4. FIG. 6 is a partial vertical schematic diagram of the fastening device, illustrating a cross section of the attachment part and a side view of the hook part. FIG. 7 is a side schematic diagram of the hook part of the fastening device, illustrating a molded latch in an initial posture or initial position. FIG. 8 is a side schematic diagram of the hook part of the fastening device, illustrating a process in which the latch is pushed in between a left restricting wall and a right restricting wall provided in the hook main body. FIG. 9 is a partial horizontal cross-sectional view of the fastening device, illustrating a horizontal cross section along a broken line X9-X9 of FIG. 8.

The fastening device 10 may be a fastening device in which an attachment part 100 and a hook part 200 are rotatably coupled around a rotational axis (not illustrated) that is parallel to the up-down direction. The attachment part 100 may be a member to which a band such as a shoulder belt may be attached. The attachment part 100 may be referred to as a "belt attachment part" or a "band attachment part." The hook part 200 may be a member that may be hooked to a ring body such as a metal or resin ring. The attachment part 100 and the hook part 200 may be resin molded parts in the present embodiment, and may be manufactured using a mold die having a cavity of a desired shape.

Illustratively and non-restrictively, the fastening device 10 may be used to fasten a shoulder belt to a bag body. Note that the specific configuration and shape of the attachment part 100 are arbitrary and may have a shape other than a ring-shaped member. The specific configuration and shape of the hook part 200 are also arbitrary and its hook shape may be different from the illustrated one either.

Figure 1:
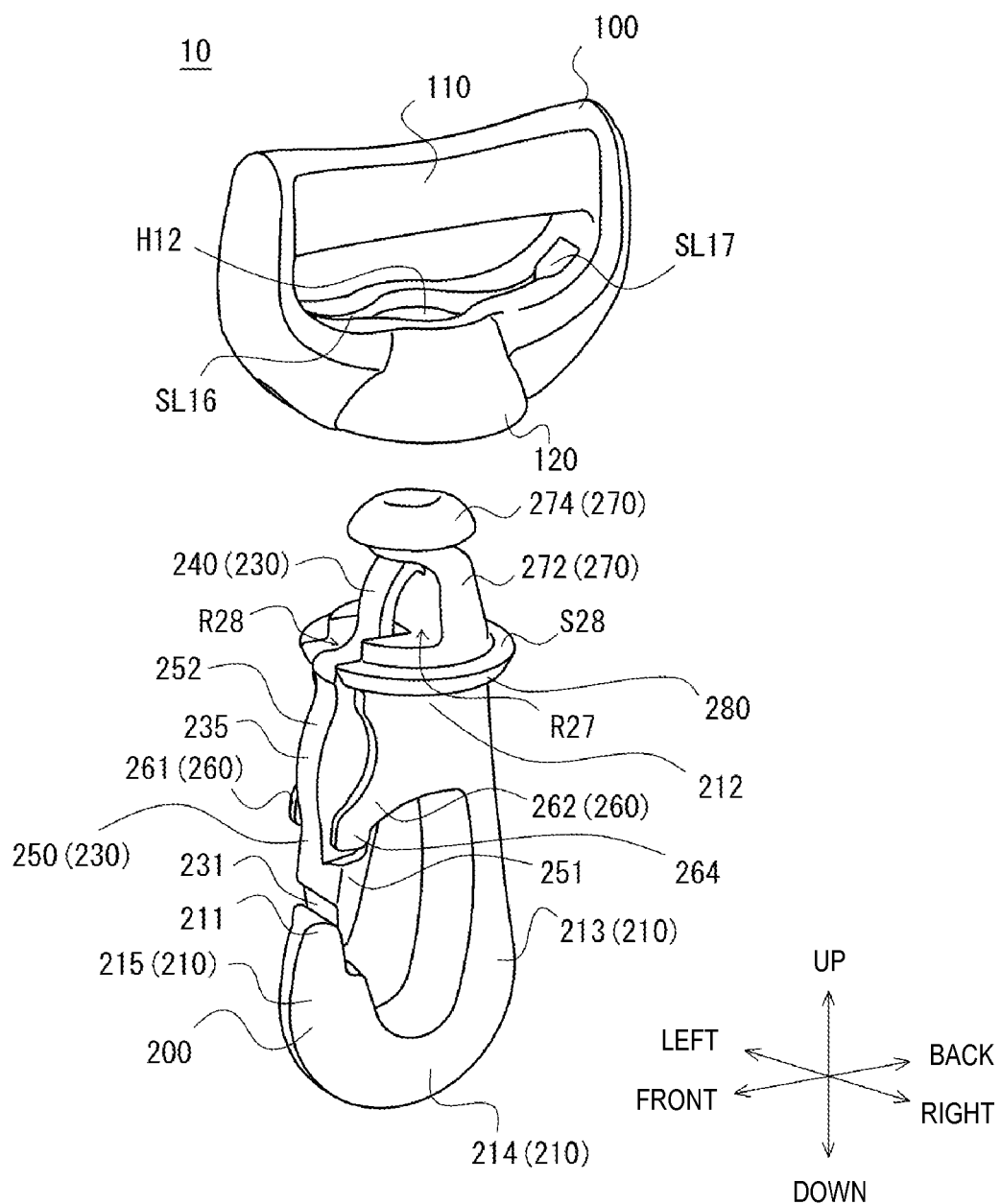
FIG. 1 is a perspective view of a fastening device according to a first embodiment of the present invention, illustrating an attachment part and a hook part before coupling.
Figure 2:
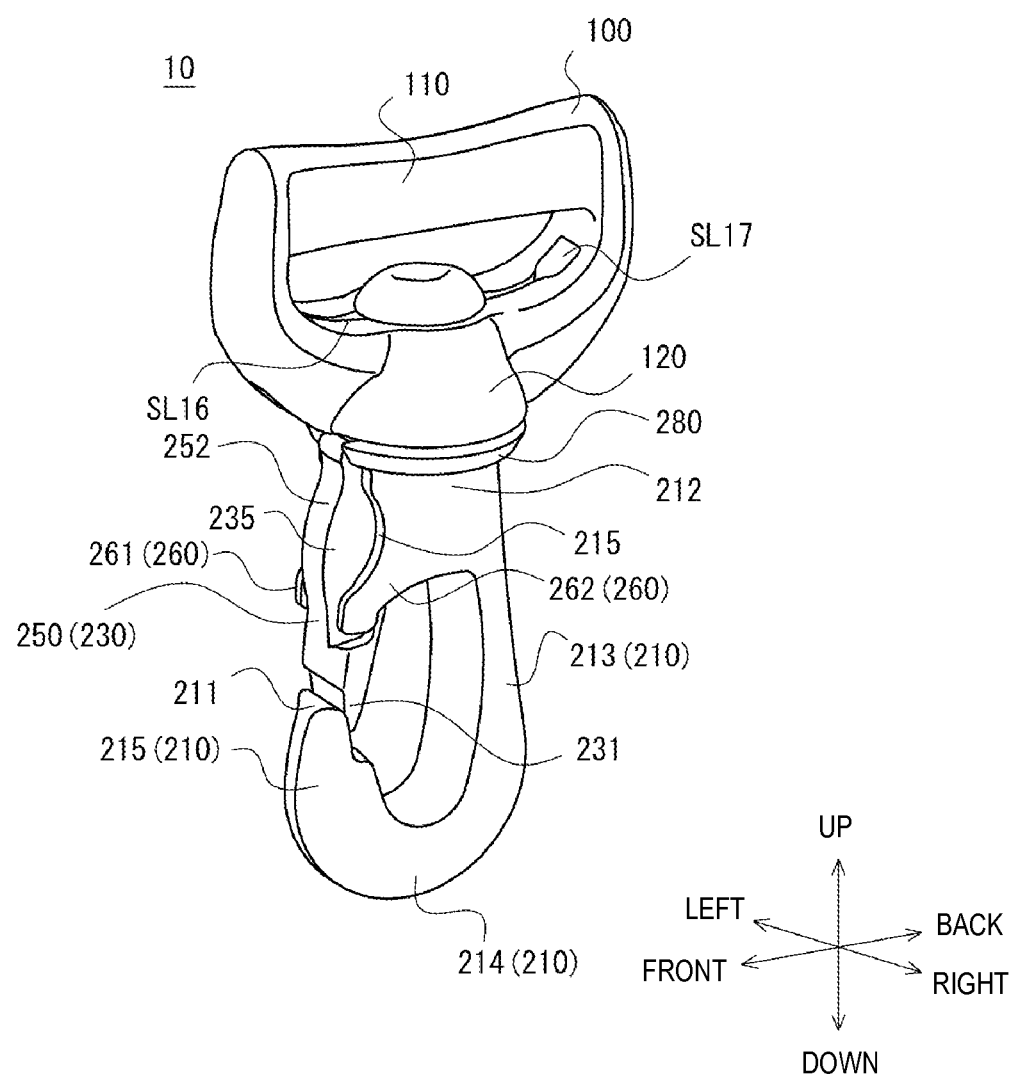
FIG. 2 is a perspective view of the fastening device according to the first embodiment of the present invention, illustrating the attachment part and the hook part after coupling.
Figure 3:
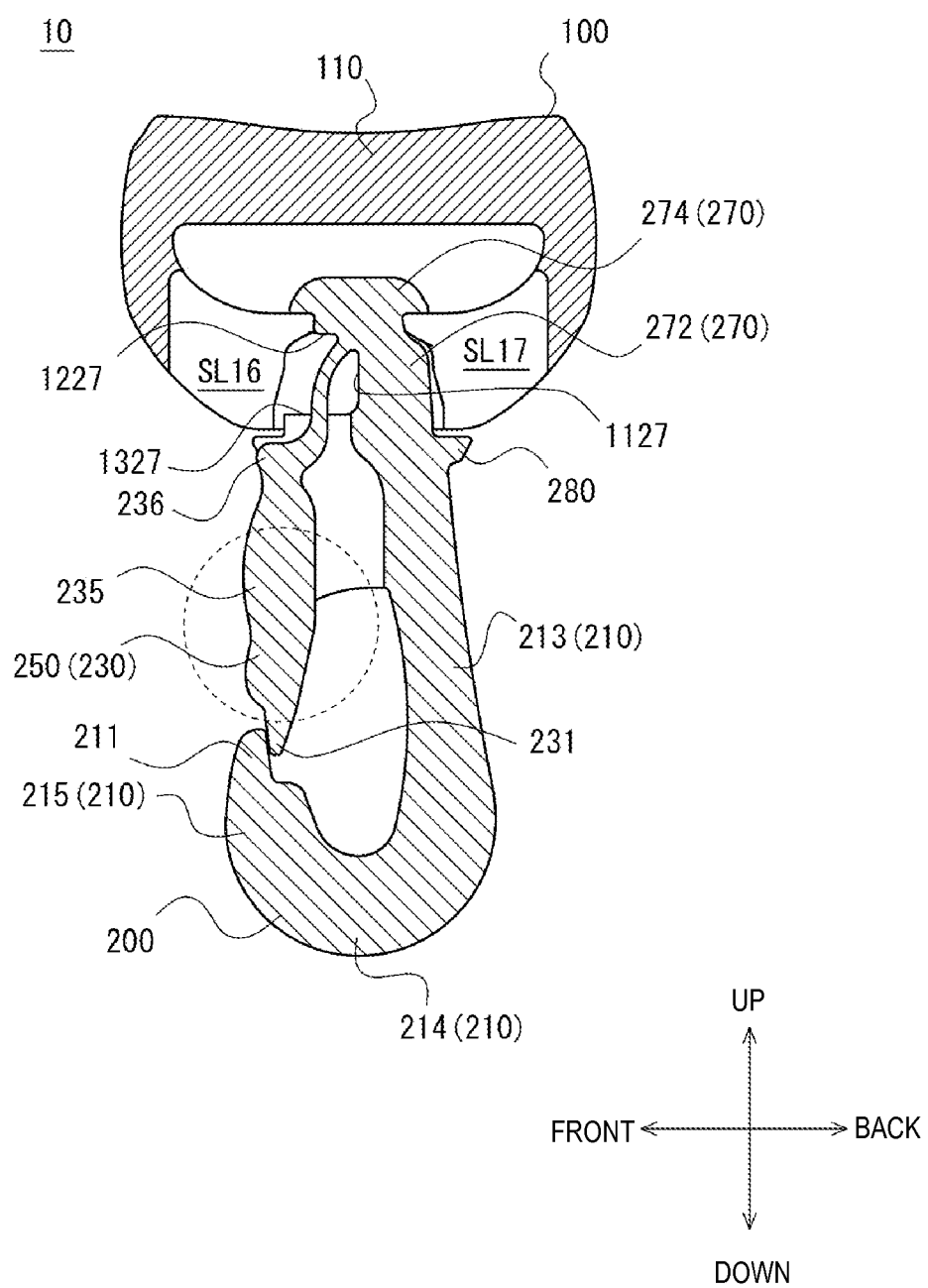
FIG. 3 is a vertical cross-sectional schematic diagram of the fastening device according to the first embodiment of the present invention and a cross-sectional schematic diagram on a plane orthogonal in the left-right direction.

As shown in FIGS. 1 to 3, the attachment part 100 may be a ring-shaped member including a belt hanging rod 110 and a shaft holding portion 120. The belt hanging rod 110 may be configured to be flat to facilitate the wrapping around of the belt. The shaft holding portion 120 may include a through-hole H12 penetrating up and down through the attachment part 100, and slits SL16, SL17 which are communicated with the through-hole H12 for allowing the through-hole H12 expansion.

As understandable from FIG. 6, the shaft holding portion 120 may be provided with an internal space that has a gradually increasing width or is configured to radially expand from top to bottom. In other words, the inner surface 125 of the shaft holding portion 120 may be configured to extend radially outwardly from top to bottom along the rotational axis. Note that the radial direction referred to here is recognized in relation to the rotational axis of the attachment part 100 and the hook part 200. The inner surface 125 of the shaft holding portion 120 may contact the outer surface 275 of a shaft 270 described later, preventing backlash of the attachment part 100 and the hook part 200 and ensuring stable rotation.

As shown in FIGS. 1 to 3, the hook part 200 is provided with a hook main body 210, a latch 230 for closing the hook main body 210 and a shaft 270 with which the base end of the latch 230 is integrally coupled. The shaft 270 is an axial shaped portion that extends away from the hook main body 210 so that coupling between the hook part 200 and the attachment part 100 is ensured. A rest 280 may be provided between the hook main body 210 and the shaft 270. Note that the "shaft" may be referred to as a "coupled portion" by considering that the latch 230 is coupled with the shaft 270.

The hook main body 210 may be a J-shaped hook part having desired rigidity and includes a hook distal end 211 and a hook base end 212. The hook main body 210 may include a main rod 213 that downwardly extends from the hook base end 212, an arc portion 214 that forwardly and upwardly extends to form an arc shape from the distal end of the main rod 213, and a sub-rod 215 that upwardly extends from the distal end of the arc portion 214. The hook distal end 211 may be equal to the distal end of the sub-rod 215 and the hook base end 212 may be equal to the base end portion of the main rod 213.

The hook main body 210 may include at least one bent portion, i.e. the arc portion 214 in the present embodiment, allowing a metal or resin ring or the like of a bag is held inside the hook main body 210. As apparent from FIG. 7, the hook part 200 may be provided with an accommodation portion H210 in which the metal or resin ring or the like is accommodated, and may be provided with a mouth H10 which is a passage allowing an entrance and exit of the metal or resin ring and the like to/from the accommodation portion H210.

The shaft 270 may be provided at the hook base end 212 of the hook main body 210 via the rest 280. The rest 280 may be a substantially disk-like portion on which the attachment part 100 may sit. The shaft 270 may be an axial shaped portion that extends from the rest 280 in the up-down direction along the rotational axis of the attachment part 100 and the hook part 200, and may include a lower shaft 272 and an upper shaft 274 in the present embodiment.

When the shaft 270 of the hook part 200 is inserted into the shaft holding portion 120 of the attachment part 100 and both are engaged together, the shaft holding portion 120 of the attachment part 100 is loosely sandwiched in the up and down direction between the higher upper shaft 274 and the lower rest 280, thus ensuring smooth rotation of the attachment part 100 and the hook part 200 around the rotational axis.

The lower shaft 272 may be a portion having gradually decreasing diameter as extending away from the hook main body 210, and may be disposed in the internal space of the shaft holding portion 120 of the attachment part 100 and surrounded by the shaft holding portion 120. The lower shaft 272 is provided with a recess R27 having a depth direction corresponding to the backward, and the lower shaft 272 may have a semi-cylindrical shape.

The upper shaft 274 may be a portion above the lower shaft 272, and may be configured into an ellipsoidal shape in a top view which is elongated in the front-back direction and narrowed in the left-right direction. The peripheral portion thereof being configured into a chamfered or curved surface. The upper shaft 274 may be a portion that will pass through the through-hole H12 of the shaft holding portion 120 and will be disposed above the shaft holding portion 120 for ensuring the coupling of the attachment part 100 and the hook part 200, therefore may preferably be configured to easily pass through the interior of the shaft holding portion 120.

The recess R27 of the lower shaft 272 includes an upper surface 1227, a lower surface 1327 and a bottom surface 1127 as shown in FIG. 3. The bottom surface 1127 connects the upper surface 1227 and the lower surface 1327 which are oppositely disposed and spaced apart in the up-down direction. The base end of the latch 230 is coupled with a joint of the upper surface 1227 and the bottom surface 1127, ensuring suitable elasticity of the latch 230 without causing excessive deformation of a spring portion 240 which will be described later. A notch R28 is provided which downwardly extends through the lower shaft 272 and the rest 280 from the lower surface 1327 of the recess R27. The latch 230 is accommodated in the notch R28, allowing suitable pivotal movement of the latch 230. In an embodiment not provided with the rest 280, the notch R28 may penetrate at least the lower shaft 272 in the up-down direction.

As shown in FIG. 6, a sandwiching portion 267 may be provided which sandwiches the latch 230 accommodated in the notch R28 from both left and right sides. The sandwiching portion 267 includes a left sandwiching portion 268 and a right sandwiching portion 269. The left sandwiching portion 268 includes a part of the lower shaft 272 and a part of the rest 280. The right sandwiching portion 269 includes a part of the lower shaft 272 and a part of the rest 280. The sandwiching portion 267 may suitably restrict leftward, rightward or both leftward and rightward displacement of the latch 230 and may prevent the disengagement of the latch 230. The sandwiching portion 267 may be understood as a restricting portion that restricts left-right displacement of the latch 230. Note that the left-right direction may be a direction orthogonal to the plane in which the latch 230 pivotally moves to open/close the hook main body 210.

The latch 230 may be provided to close the mouth H10 of the hook main body 210 and open/close the mouth H10 as the latch 230 pivotally moves. The latch 230 may include the spring portion 240 and a latch main body 250 connected to the spring portion 240. The spring portion 240 may be elastically configured to enable urging of the latch 230 toward an initial posture of the latch 230. Note that the "toward an initial posture of the latch 230" may be an example of a direction away from the hook main body 210. Although not necessarily limited to this, the latch main body 250 may be configured to be more rigid than the spring portion 240, in other words, may be configured to be greater in size or volume than the spring portion 240. The latch 230 is configured by assigning a spring function and a closing function to the spring portion 240 and the latch main body 250, respectively.

The latch main body 250 of the latch 230 may be shaped to configure a rest surface for the attachment part 100 together with the rest 280. As shown in FIG. 3, a projection 236 may be preferably provided in the latch main body 250 and the projection 236 preferably has a surface flush with the rest surface S28 of the rest 280 shown in FIG. 1. Such a configuration allows the attachment part 100 to be seated on the rest surface which is substantially continuous in the circumferential direction and can stabilize the rotation thereof.

As apparent from FIG. 7 illustrating the hook part 200 removed from a mold die, the initial posture of the latch 230 may be substantially parallel to the front-back direction orthogonal to the repeatedly mentioned rotational axis. The latch 230 in the initial posture may be pivotally moved downward and backward around the spring portion 240 and a latch distal end 231 of the latch 230 may be stopped by the hook distal end 211 of the hook main body 210. Although the latch 230 is urged toward the initial posture according to the elasticity of the spring portion 240, the returning is restricted by the hook distal end 211. In this condition, even when a manipulated portion 235 of the latch 230 is pushed backward, the latch 230 will return to the state in which the latch 230 is stopped by the hook distal end 211 according to the elasticity of the spring portion 240.

As shown in FIG. 2, arc-shaped recesses 215 are provided on respective front sides of a left restricting wall 261 and a right restricting wall 262 making up a restricting portion 260 which will be described later. The manipulated portion 235 of the latch 230 projects forward from the recess 215 so that the latch 230 will be easily displaced in the front-back direction by pushing in of the manipulated portion 235.

The latch 230 may be elongated in the up-down direction when the hook main body 210 shown in FIGS. 1 to 3 is closed. The spring portion 240 of the latch 230 may be formed to have narrower width and thinner thickness than the latch main body 250. That is, the maximum width of the spring portion 240 may be less than the maximum width of the latch main body 250, and the maximum thickness of the spring portion 240 may be less than the maximum thickness of the latch main body 250.

In the present embodiment, the latch main body 250 may be integrally coupled with the shaft 270 via the spring portion 240. According to this configuration, a change in appearance or a functional addition to the latch main body 250 may be possible more easily. For example, the shape of the latch 230 may be improved to present an actual or seeming "stronger latching force." Note that in the present embodiment, elasticity of the latch 230 can be ensured mainly by the spring portion 240 and rigidity of the latch 230 can be ensured mainly by the latch main body 250. The latch main body 250 may be configured to be much larger than the spring portion 240 to provide rigidity and ensure the degree of freedom of the shape of the latch 230.

As shown in FIG. 1, a wider width portion 251 which is wide in the left-right direction is provided on the distal end side of the latch main body 250, and a narrower width portion 252 which is narrower than the wider width portion 251 is provided on the base end side thereof. The cutout in the hook main body 210 may be closed by the wider width portion, making it possible to ensure an actual or seeming "strong stopper force".

The connection point of the latch 230, i.e. the connection point of the base end of the spring portion 240 in the present embodiment, and the shaft 270 may be positioned farther from the hook main body 210 along the rotational axis than the connection point of the hook main body 210 and the shaft 270. In this case, it may be possible to suitably ensure pivotal movement of the latch 230. Note that in the present embodiment, since the rest 280 is provided between the hook main body 210 and the shaft 270, the connection point of the hook main body 210 and the shaft 270 is the position at which the rest 280 is provided. It can therefore be said that the connection point of the latch 230 and the shaft 270 is farther from the hook main body 210 along the rotational axis compared to the rest 280. In the state shown in FIG. 3, the spring portion 240 is disposed in the recess R27 of the lower shaft 272 and extends adjacent to the lower shaft 272 from the base end to the latch main body 250 side.

The spring portion 240 may be mechanically or structurally weaker than the latch main body 250. Accordingly, as understandable from FIG. 6, the spring portion 240 of the latch 230 may preferably be surrounded and protected by the shaft holding portion 120 of the attachment part 100. The spring portion 240 in a bent state may be preferably prevented from contacting the inner surface 125 of the shaft holding portion 120. From this viewpoint, the base end of the spring portion 240 may be preferably integrally coupled with the bottom side of the recess R27 of the lower shaft 272, that is, close to the bottom surface 1127.

The hook main body 210 may preferably include a restricting portion 260 for restricting left-right displacement of the latch 230. The restricting portion 260 may be configured to sandwich the latch 230, i.e. the narrow width portion 252 of the latch main body 250, and can thereby suppress backlash of the latch 230 in the left-right direction and prevent the disengagement of the latch distal end 231 from the hook distal end 211 of the hook main body 210. In the present embodiment, the restricting portion 260 includes a left restricting wall 261 and a right restricting wall 262 spaced apart one another in the left-right direction so as to sandwich the latch 230. The left restricting wall 261 and right restricting wall 262 are respectively configured to extend toward the hook distal end 211 from the hook base end 212 of the hook main body 210.

In order for the restricting portion 260 to restrict positional recovery of the latch 230 away from the hook main body 210, the restricting portion 260 may preferably engage with the latch 230. Various aspects can be considered as a specific structure to achieve this object, and an example is envisaged where the restricting portion 260 is provided with at least one first lug 263 or 264, the latch 230 is provided with at least one second lug 253 or 254, the second lug 253 or 254 is provided in a shape protruding in the left-right direction and the first lug 263 or 264 extends in a direction other than the left-right direction, i.e. a downward in the present embodiment, so as to engage with the second lug 253 or 254.

As apparent from additional references of FIGS. 4 and 5, the left restricting wall 261 and the right restricting wall 262 are each provided with the first lugs 263 and 264, and the latch 230 is provided with the second lugs 253 and 254 which engage with the first lugs 263 and 264, respectively. The engagement between each first lug 263 or 264 and each second lug 253 or 254 prevents the latch 230 from moving back to a position closer to the initial posture.

The first lug 263 may be a lower end of the left restricting wall 261 that faces the hook distal end 211 and projects downward toward the hook distal end 211 side. The first lug 264 may be a lower end of the right restricting wall 262 that faces the hook distal end 211 and projects downward toward the hook distal end 211 side. In the relationship between the first lug 263 and the first lug 264, the first lug 263 may be called a (first) left side lug and the first lug 264 may be called a (first) right side lug.

The second lug 253 may be a leftward projecting portion provided on the left surface of the latch main body 250. The second lug 254 may be a rightward projecting portion provided on the right surface of the latch main body 250. In this way, the second lug 253 and the second lug 254 oppositely project one another in the left-right direction. In the relationship between the second lug 253 and the second lug 254, the second lug 253 may be called a "(second) left side lug" and the second lug 254 may be called a "(second) right side lug." The engagement between the first lug 263 and the second lug 253, and the engagement between the first lug 264 and the second lug 254 can prevent pivotal movement of the latch 230 toward the initial posture and prevent the disengagement of the latch distal end 231 from the hook distal end 211 of the hook main body 210.

As shown in FIG. 5, an underside S250 of the latch main body 250 of the latch 230 that comes into contact with the left restricting wall 261 and the right restricting wall 262 when the latch 230 is pushed in between the left restricting wall 261 and the right restricting wall 262 is shaped to have a curved surface. Furthermore, when the latch 230 is pushed in between the left restricting wall 261 and the right restricting wall 262, each part of the left restricting wall 261 and the right restricting wall 262 with which the latch 230 comes into contact is provided with each of recesses 265 and 266. Curved surfaces may also be provided instead of the recesses 265 and 266. As will be understandable from references to FIGS. 7 to 9, when the latch 230 in an initial posture is pushed in between the left restricting wall 261 and the right restricting wall 262, the above-described recesses 265 and 266, and curved underside S250 may facilitate outward displacement of the left restricting wall 261 and the right restricting wall 262 and an accompanying increase in the distance between the left restricting wall 261 and the right restricting wall 262 as indicated by a broken line arrow in FIG. 9.

As apparent from the above description, the latch 230 in the present embodiment may include the spring portion 240 provided on the base end side of the latch 230, and the latch main body 250 coupled with the shaft 270 via the spring portion 240. This configuration may improve the appearance of the latch main body 250 or facilitate a functional addition.

The spring portion 240 may be preferably configured to be elastic to enable urging of the latch 230 toward the initial posture of the latch 230. The connection point of the latch 230, i.e. the base end of the spring portion 240 in the present embodiment, and the shaft 270 may be preferably positioned farther from the hook main body 210 along the rotational axis than the connection point between the hook main body 210 and the shaft 270. In this case, it is possible to suitably ensure pivotal movement of the latch 230.

The present embodiment allows the latch main body 250 to be configured to be much greater, for example, to be much greater than the spring portion 240, facilitating ensuring or presentation of a "stronger latching force".

The present embodiment is provided with the spring portion 240 which is mechanically and structurally weaker than the latch main body 250. However, an impression of "weaker latch" may not be given. This is because the spring portion 240 is surrounded by the shaft holding portion 120 of the attachment part 100, is sufficiently protected from external impacts, and does not appear on the surface.

In the present embodiment, the wider width portion 251 may be provided to the distal end side of the latch main body 250 and a robust appearance may be presented.

In the case where the latch 230 is provided with the spring portion 240 as in the present embodiment, there may be a concern that the latch main body 250 might pivotally move in left or right around the spring portion 240 causing the latch 230 to come off more easily. In consideration of this problem, the present embodiment provides the hook main body 210 with the left restricting wall 261 and the right restricting wall 262 that can sandwich the latch 230 to restrict the left-right displacement of the latch main body 250. This may reduce or suppress inconvenience when the latch 230 is configured as described above.

Second Embodiment

Figure 10:
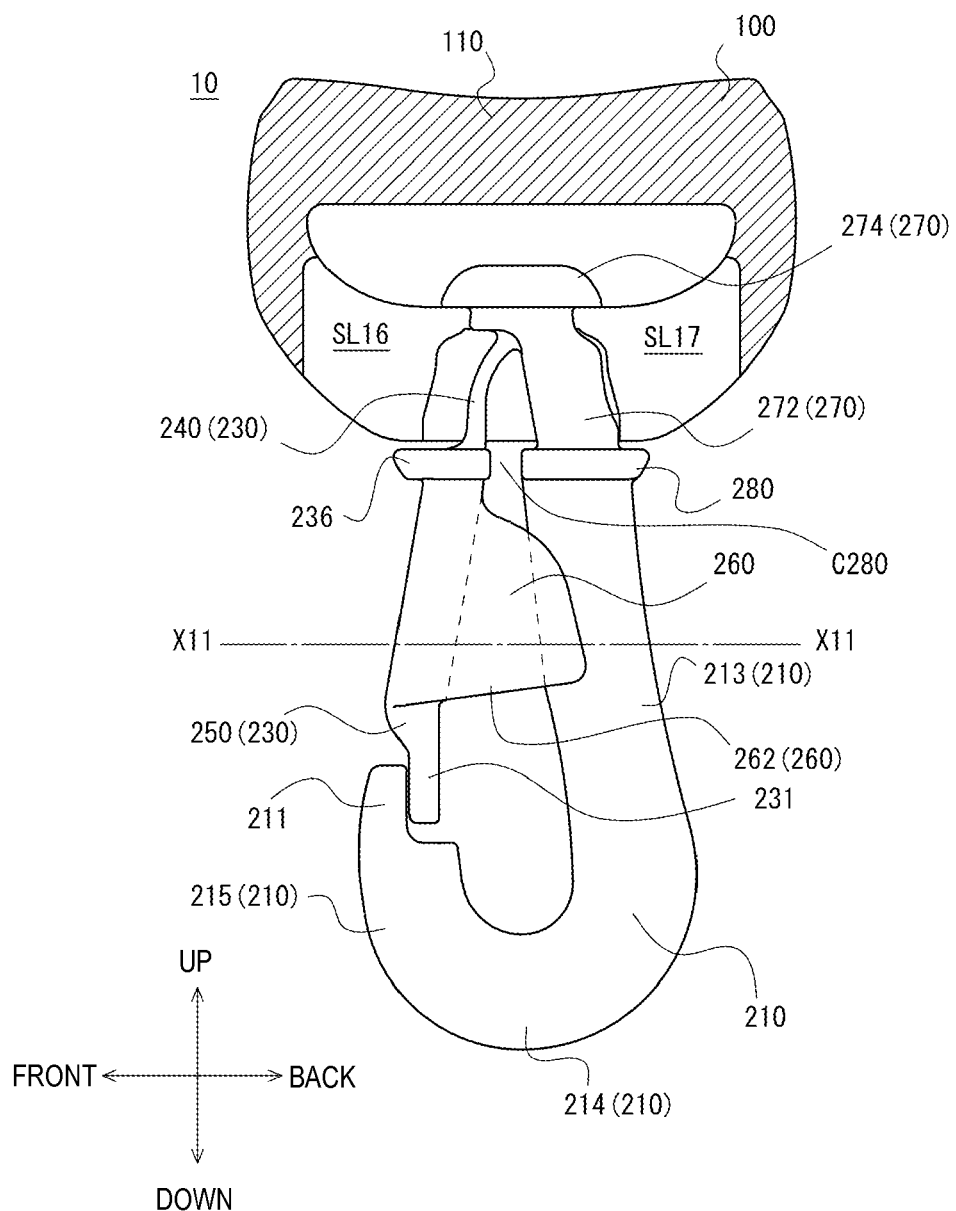
FIG. 10 is a vertical schematic diagram of a fastening device according to a second embodiment of the present invention, illustrating a cross section of an attachment part and a side view of a hook part.
Figure 11:
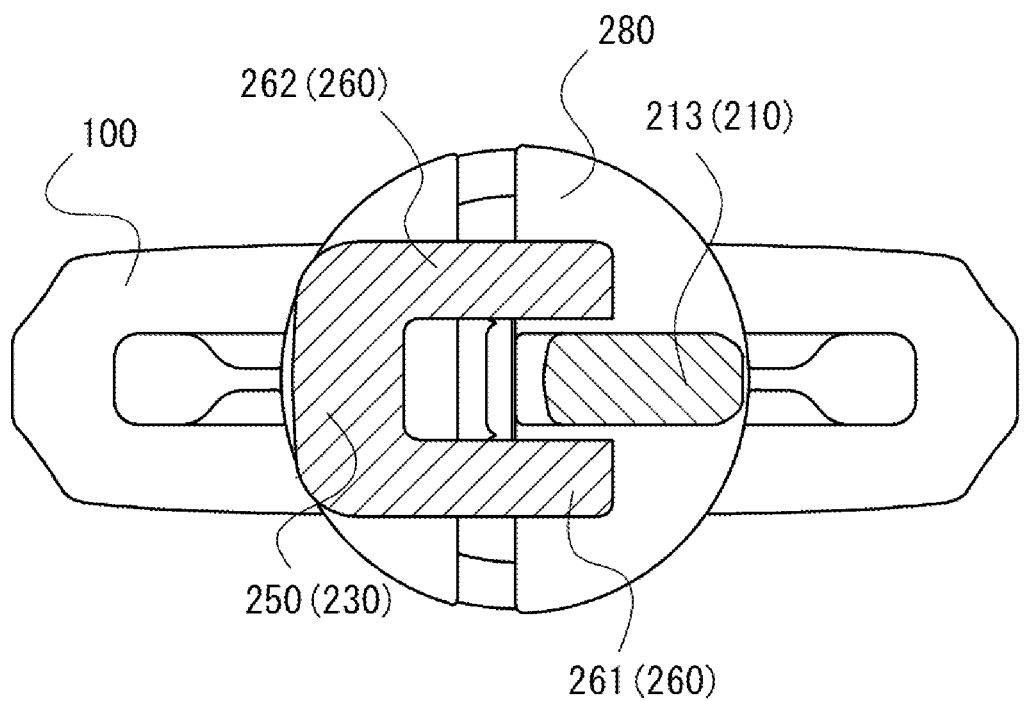
FIG. 11 is a horizontal schematic diagram of the fastening device according to the second embodiment of the present invention, illustrating a horizontal cross section along a single-dot dashed line X11-X11 of FIG. 10.
Figure 12:
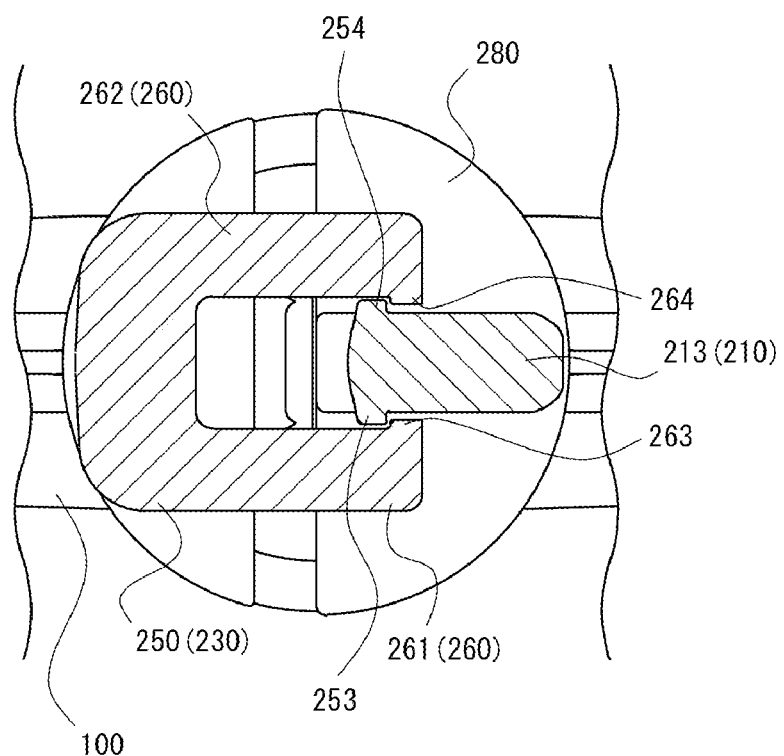
FIG. 12 is a horizontal schematic diagram of the fastening device according to the second embodiment of the present invention, illustrating a modification of FIG. 11.

A second embodiment will be described with reference to FIGS. 10 to 12. FIG. 10 is a vertical schematic diagram of a fastening device, illustrating a cross section of an attachment part thereof and a side view of a hook part thereof. FIG. 11 is a horizontal schematic diagram of the fastening device, illustrating a horizontal cross section along a single-dot dashed line X11-X11 of FIG. 10. FIG. 12 is a horizontal schematic diagram of the fastening device, illustrating a modification of FIG. 11.

In the present embodiment, unlike the first embodiment, the restricting portion 260 for restricting displacement of the latch 230 in the left-right direction is provided not at the hook main body 210 but at the latch 230. Effects similar to those in the first embodiment can be obtained in such a case, too.

Once again, the latch main body 250 may be coupled integrally with the shaft 270 via the spring portion 240 in the present embodiment, too. It may be possible to ensure elasticity of the latch 230 mainly by the spring portion 240 and ensure rigidity of the latch 230 mainly by the latch main body 250. Furthermore, the connection point of the latch 230, i.e. the connection point of the base end of the spring portion 240 in the present embodiment, and the shaft 270, may be positioned farther from the hook main body 210 along the rotational axis than the coupling position of the hook main body 210 and the shaft 270, suitably ensuring pivotal movement of the latch 230.

The latch main body 250 may be formed to be much greater than the spring portion 240 and may be provided with rigidity, ensuring the degree of freedom of the shape thereof. Based on this respect, the shape of the latch 230 may be improved to present an actual or seeming "stronger latching force", meaning that the latch main body 250 may be provided with the restricting portion 260.

As shown in FIGS. 10 and 11, the restricting portion 260 may be configured to sandwich the hook main body 210, i.e. the main rod 213 of the hook main body 210, preventing the latch 230 from pivotally moving in the left-right direction and preventing the disengagement of the latch distal end 231 from the hook distal end 211 of the hook main body 210. In the present embodiment, the restricting portion 260 includes the left restricting wall 261 and the right restricting wall 262 disposed, spaced apart one another in the left-right direction so as to sandwich the main rod 213. The left restricting wall 261 and the right restricting wall 262 are respectively provided to extend toward the main rod 213 from the latch main body 250.

The portion of the main rod 213 sandwiched by the left restricting wall 261 and the right restricting wall 262 may be formed to be thinner. Design decoration may also be applied to both surfaces of the left restricting wall 261 and the right restricting wall 262.

As shown in FIG. 10, when the latch 230 is stopped by the hook main body 210, a clearance C280 is provided between the projection 236 and the rest 280 provided in the latch 230. This ensures smooth pivotal movement of the latch 230.

FIG. 12 illustrates a modification of the configuration shown in FIG. 11. Following the disclosure of the first embodiment, the left restricting wall 261 and the right restricting wall 262 may be provided with the first lugs 263 and 264 respectively and the main rod 213 of the hook main body 210 may be provided with the second lugs 253 and 254 that engage with the first lugs 263 and 264, respectively. The engagements of the first lugs 263 and 264 with the respective second lugs 253 and 254 restricts the latch 230 from moving back to the initial posture. In the present embodiment, the first lug 263 and the second lug 253 to be interlocked one another have respective shapes oppositely protruding in the left-right direction, and likewise, the first lug 264 and the second lug 254 to be interlocked one another have respective shapes oppositely protruding in the left-right direction.

The first lug 263 may be provided in a rightward projected shape from the inner surface of the left restricting wall 261, facing the left surface of the main rod 213 in the state shown in FIG. 12. The first lug 264 may be provided in a leftward projected shape from the inner surface of the right restricting wall 262, facing the right surface of the main rod 213 in the state shown in FIG. 12. The second lug 253 may be provided in a leftward projected shape between the front surface and the left surface of the main rod 213. The second lug 254 may be provided in a rightward provided shape between the front surface and the right surface of the main rod 213. The engagement between the first lug 263 and the second lug 253, and the engagement between the first lug 264 and the second lug 254 can prevent the latch 230 from pivotally moving toward the initial posture and prevent the disengagement of the latch distal end 231 from the hook distal end 211 of the hook main body 210.

Third Embodiment

Figure 13:
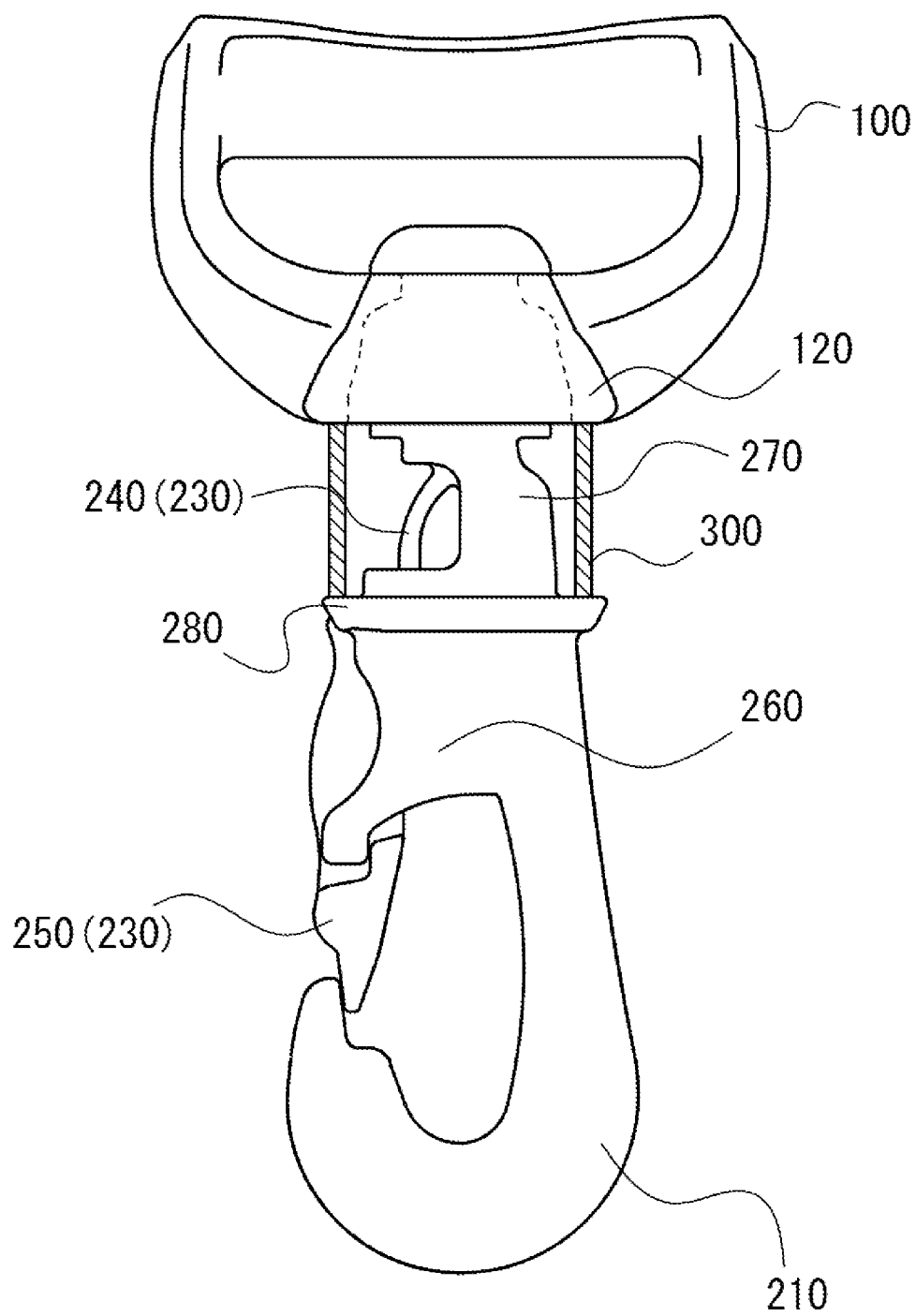
FIG. 13 is a vertical schematic diagram of a fastening device according to a third embodiment of the present invention, illustrating a cross section of a silicone cover.
Figure 14:
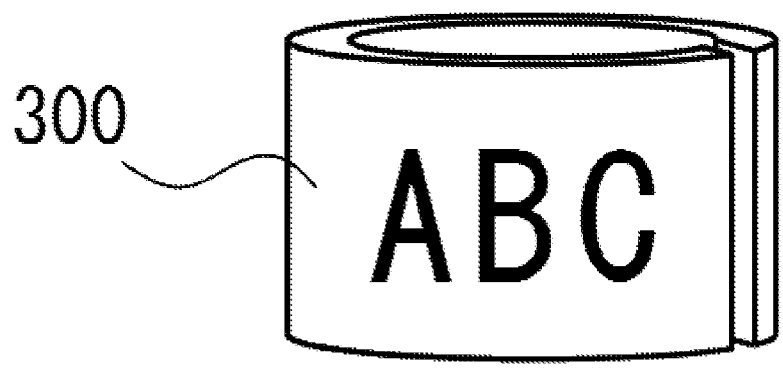
FIG. 14 is a perspective view of a silicone cover according to the third embodiment of the present invention.

A third embodiment will be described with reference to FIGS. 13 and 14. FIG. 13 is a vertical schematic diagram of a fastening device and shows a cross section of a silicone cover. FIG. 14 is a perspective view of the silicone cover.

In the present embodiment, instead of surrounding the shaft 270 and the spring portion 240 of the hook part 200 by the shaft holding portion 120 of the attachment part 100 as in the first and second embodiments, they are surrounded and protected by separate protective member 300. Effects similar to those of the aforementioned embodiments can be obtained in such a case, too.

The protective member 300 that at least partially surrounds and protects the shaft 270 and the spring portion 240 is, for example, an elastic cylindrical member and is made of, for example, silicone. A notch may be preferably provided on the circumferential wall of the cylindrical protective member 300. This ensures simple attachment of the protective member 300 to the shaft 270. Needless to say, a continuous cylindrical protective member without such a break may also be used. Design decoration such as characters, graphics, symbols or a combination thereof may also be applied to the outer peripheral surface of the protective member 300 and can improve the aesthetic appearance of the fastening device 10.

Fourth Embodiment

Figure 15:
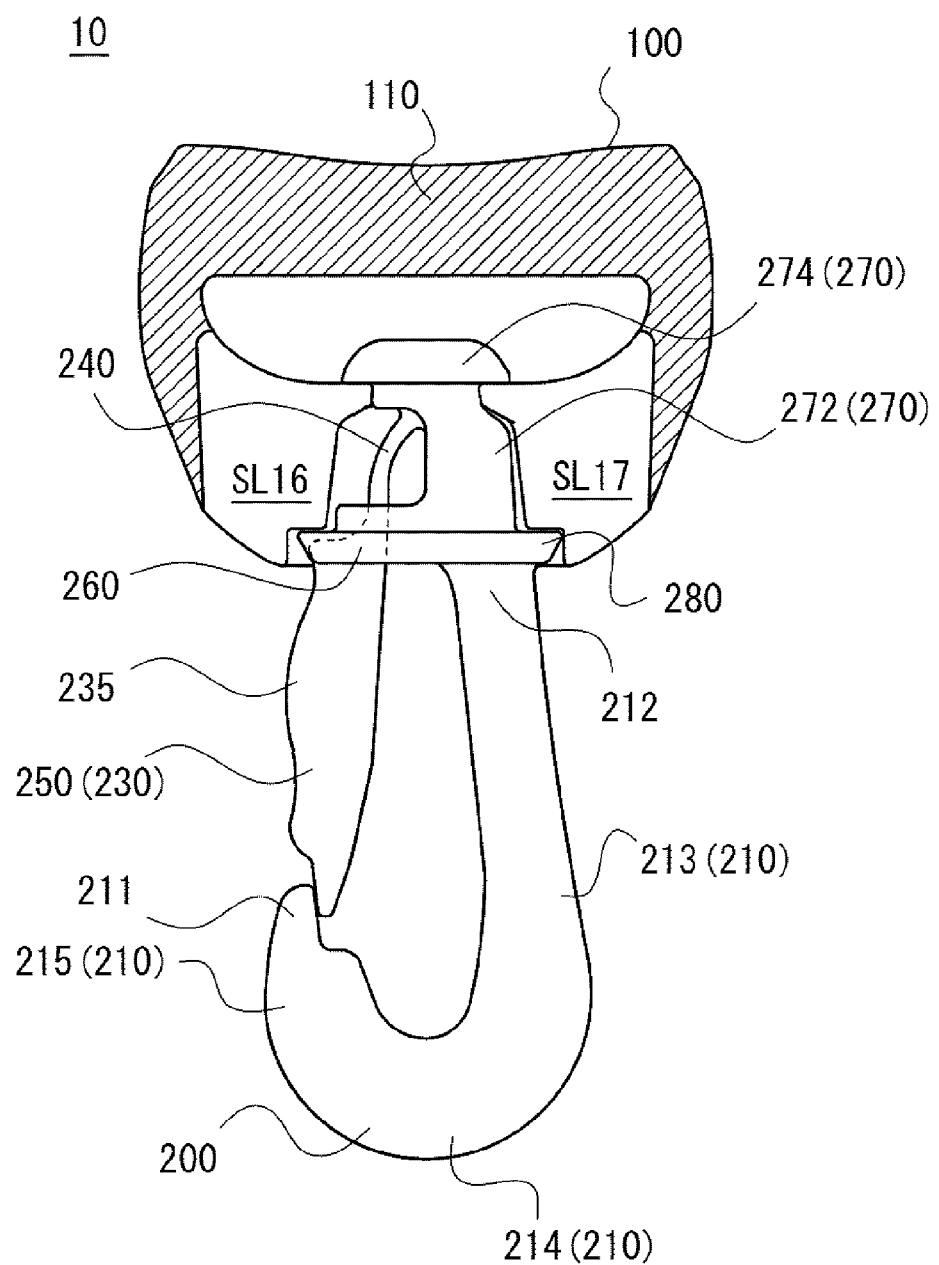
FIG. 15 is a vertical schematic diagram of a fastening device according to a fourth embodiment of the present invention, illustrating a cross section of an attachment part and a side view of a hook part.

A fourth embodiment will be described with reference to FIG. 15. FIG. 15 is a vertical schematic diagram of a fastening device, showing a cross section of an attachment part and a side view of a hook part.

The left and light displacement of the latch 230 was restricted by both of the sandwiching portion 267 and the restricting portion 260 in the first embodiment. In contrast, the left and right displacement of the latch 230 may be restricted by the sandwiching portion 267 only, not necessarily limited though. Effects similar to those of the above-described embodiments may be obtained in such a case, too. The sandwiching portion 267 may also be an embodiment of the restricting portion as described in the first embodiment.

Based on the above-described instructions, those skilled in the art can add various modifications to each embodiment. Reference numerals incorporated in the scope of claims are for reference and should be by no means referenced for the purpose of limited interpretation of the scope of claims. A specific configuration, shape, size and material of the attachment part, hook part, and protective member are arbitrary. A specific configuration, shape, size and material of the hook main body of the hook part, shaft, rest and latch are arbitrary. A specific configuration, shape, size and material of the spring portion and the latch main body of the latch are arbitrary. The shaft may extend along an axis other than the rotational axis. The number of lugs and their specific configurations are arbitrary.

REFERENCE SIGNS LIST

10 Fastening device
100 Attachment part
200 Hook part
210 Hook main body
211 Hook distal end
212 Hook base end
230 Latch
231 Latch distal end
235 Manipulated portion
240 Spring portion
250 Latch main body
260 Restricting portion
267 Sandwiching portion
270 Shaft

The invention claimed is:

1. A fastening device in which an attachment part and a hook part are rotatably coupled around a rotational axis, the hook part comprising:
a hook main body;
a latch for closing the hook main body; and
a coupled portion to which a base end of the latch is integrally coupled, the coupled portion extending away from the hook main body along the rotational axis such that coupling between the attachment part and the hook part is ensured, wherein
the latch comprises:
a spring portion provided closer to the base end of the latch, the spring portion being elastically configured to enable urging of the latch away from the hook main body; and
a latch main body coupled with the coupled portion via the spring portion, and wherein
a connection point of the latch and the coupled portion is farther from the hook main body along the rotational axis than a connection point of the hook main body and the coupled portion,
wherein the hook main body is coupled to a lower end of the coupled portion, and the base end of the latch is coupled to a portion between the lower end and an upper end of the coupled portion.

2. The fastening device according to claim 1 in which a left-right direction is defined as a direction orthogonal to a plane in which the latch pivotally moves around the spring portion to open/close the hook main body, wherein
one of the hook main body and the latch comprises at least one restricting portion to restrict displacement in the left-right direction of the other of the hook main body and the latch.

3. The fastening device according to claim 2, wherein the restricting portion is configured to sandwich the hook main body or the latch in the left-right direction.

4. The fastening device according to claim 3, wherein the restricting portion is engageable with the hook main body or the latch so as to restrict displacement of the latch in a direction away from the hook main body.

5. The fastening device according to claim 3, wherein
the restricting portion provided on the hook main body comprises at least one first lug,
the latch comprises at least one second lug,
the second lug is shaped to protrude in the left-right direction, and
the first lug extends in a direction other than the left-right direction so as to be engageable with the second lug.

6. The fastening device according to claim 3, wherein
the restricting portion provided on the latch comprises at least one first lug,
the hook main body comprises at least one second lug, and
the first lug and the second lug to be interlocked one another are oppositely projected in the left-right direction.

7. The fastening device according to claim 3 in which the restricting portion comprises a left restricting wall and a right restricting wall arranged in the left-right direction so as to sandwich the hook main body or the latch, wherein
the fastening device further comprising:
a first lug provided on at least one of the left restricting wall and the right restricting wall; and
a second lug engageable with the first lug, wherein interlocking between first lug and the second lug restricts displacement of the latch away from the hook main body.

8. The fastening device according to claim 3 in which the restricting portion comprises a left restricting wall and a right restricting wall arranged in the left-right direction so as to sandwich the hook main body or the latch, wherein
the latch main body comprises a latch distal end that engages with the hook distal end of the hook main body, and
a thickness of the latch distal end along the left-right direction is greater than a thickness along the left-right direction of a portion of the latch main body sandwiched by the left restricting wall and right restricting wall.

9. The fastening device according to claim 1, wherein the coupled portion is provided with a recess and a base end of the spring portion is coupled with a surface of the recess.

10. The fastening device according to claim 9, wherein a notch extending through at least the coupled portion from the surface of the recess toward the hook main body is provided, and the notch is able to partially accommodate the latch.

11. The fastening device according to claim 1,
wherein the hook part further comprises a rest between the coupled portion and the hook main body, the attachment part being able to sit on the rest and wherein the connection point of the latch and the coupled portion is farther from the hook main body than the rest along the rotational axis.

12. The fastening device according to claim 1,
wherein the hook part further comprises a rest on which the attachment part can sit, and
the latch is shaped to provide a rest surface for the attachment part together with the rest.

13. A hook part that is attachable to an attachment part in a rotatable manner around a rotational axis, the hook part comprising:
a hook main body;
a latch for closing the hook main body; and
a coupled portion with which a base end of the latch is integrally coupled, the coupled portion extending away from the hook main body along the rotational axis such that coupling between the attachment part and the hook part is ensured, wherein the latch comprises:
a spring portion provided closer to the base end of the latch, the spring portion being elastically configured to enable urging of the latch away from the hook main body; and
a latch main body coupled with the coupled portion via the spring portion, and wherein
a connection point of the latch and the coupled portion is farther from the hook main body along the rotational axis than a connection point of the hook main body and the coupled portion,
wherein the hook main body is coupled to a lower end of the coupled portion, and the base end of the latch is coupled to a portion between the lower end and an upper end of the coupled portion.

* * * * *